United States Patent [11] 3,607,803

[72] Inventors Rosemarie Toepel
 Basle;
 Heinz Abel, Reinach/Bl; Arthur Maeder,
 Therwil, all of Switzerland
[21] Appl. No. 872,368
[22] Filed Oct. 29, 1969
[45] Patented Sept. 21, 1971
[73] Assignee Ciba Limited
 Basel, Switzerland
[32] Priority Nov. 8, 1968
[33] Switzerland
[31] 16733/68

[54] STABLE PREPARATIONS OF MODIFIED AMINOPLAST PRECONDENSATES, PROCESSES FOR THEIR MANUFACTURE AND USE
 9 Claims, No Drawings
[52] U.S. Cl.................................................... 260/21,
 117/124 E, 117/141, 117/161 F, 117/161 P,
 117/161 UN, 260/29.4 R, 260/31.2 N, 260/33.2 R,
 260/33.4 R
[51] Int. Cl...................................................... C08g 37/30,
 C09d 3/50
[50] Field of Search............................................ 260/18 N,
 21

[56] References Cited
UNITED STATES PATENTS
3,223,656 12/1965 Frazier ........................ 260/21
3,306,865 2/1967 Wheeler ...................... 260/21
FOREIGN PATENTS
117,285 8/1943 Australia...................... 260/21
1,083,771 9/1967 Great Britain................ 260/21

Primary Examiner—Donald E. Czaja
Assistant Examiner—Ronald W. Griffin
Attorneys—Harry Goldsmith, Joseph G. Kolodny and Mario A. Monaco ABSTRACT: Stable preparations of modified aminoplast precondensates are provided, which are prepared by reacting aminoplast precondensates containing alkyl-ether groups with basic polyamides. The polyamides are made from polymeric unsaturated acids and polyalkylene polyamines. The reaction is carried out in the presence of organic solvents at 20° to 100° C. Not later than after completion of the reaction, it is ensured that a sample of the reaction mixture has a pH-value of 2 to 8 after dilution with water. The resulting reaction products are soluble in water and are useful in the textile industry e.g. for rendering wool nonfelting. Especially suitable are the preparations when applied in combination with a dyeing process.

STABLE PREPARATIONS OF MODIFIED AMINOPLAST PRECONDENSATES, PROCESSES FOR THEIR MANUFACTURE AND USE

It has been found that valuable new stable preparations of aminoplast precondensates are obtained if aminoplast precondensates containing alkyl-ether groups are reacted with basic polyamides of polymeric, preferably dimeric, unsaturated fatty acids and polyalkylenepolyamines, in the presence of organic solvents, to give water-soluble compounds, and provision is made through addition of acid, not later than immediately after completion of the reaction, for a sample of the reaction mixture after addition of water to have a pH-value of 2 to 8, preferably 2 to 7.

The aminoplast precondensates which serve as starting substances are completely or especially partially etherified methylol compounds of nitrogen-containing compounds which form aminoplasts such as urea, urea derivatives, for example ethyleneurea, propyleneurea or glyoxalmonourein.

Preferably, etherified methylolaminotriazines are used such as for example alkyl-ethers of highly methylolated melamine of which the alkyl residues contain 1 to 4 carbon atoms. Possible alkyl residues are, amongst others, methyl, ethyl, n-propyl, isopropyl, n-butyl and also n-hexyl residues. In addition to such alkyl residues, yet further residues, for example polyglycol residues, can also be present in the molecule. Furthermore, n-butyl-ethers of a highly methylolated melamine, which contain 2 to 3 butyl groups in the molecule, are preferred. By highly methylolated melamines there are here to be understood those with an average of at least 5, appropriately about 5.5, methylol groups.

As further starting substances, the polyamides of the indicated composition are required. Possible polymeric fatty acids for the manufacture of these basic polyamides are for example dimerized to trimerized linoleic and/or linolenic acid. The polyamides are obtained by condensation with polyamines, especially aliphatic polyamines such as diethylenetriamine, triethylenetetramine and tetraethylenepentamine, that is to say amines of the formula

$$H_2N-(CH_2-CH_2-NH)_n-CH_2-CH_2-NH_2$$

wherein $n$ is 1, 2 or 3 and can, in the case of mixtures, also assume a nonintegral average value, for example between 1 and 2. These polyamides must be basic and this is achieved by using an excess of amino groups ($H_2N-$ and alkylene-NH-alkylene) in comparison with the carboxylic acid groups in the polyamide condensation.

The aminoplast precondensates are reacted with the basic polyamides in the equivalent ratio of 1:0.11 to 1:1.45. In the case of the aminoplast precondensates, one equivalent is to be understood as the quotient of the molecular weight and the total number of the methylol groups (free plus etherified) present in the molecule. The amount of basic polyamide equivalent to one mol of monoamine corresponds to one amino equivalent. Thus for example one mol of methylol compound containing an average of 5.5 (partially etherified) methylol groups is reacted with the amount of basic polyamide corresponding to 0.6 to 8 amino equivalent values.

Further, the reaction is carried out in the presence of water-soluble organic solvents and in particular appropriately in those which are easily soluble in water or miscible therewith to any desired extent, for example aliphatic alcohols of this nature. As examples of solvents, dioxan, isopropanol, ethanol, methanol, ethylene glycol mono-n-butyl-ether and diethylene glycol mono-n-butyl-ether may be mentioned.

Furthermore, the reaction is carried out in a manner such that water-soluble products are produced. This is also possible without difficulty in the case of aminoplast precondensates which are sparingly soluble in water, for example the methylolmelamine-butyl-ethers mentioned, and the course of the reaction can here be easily followed by diluting a sample with water. The pH-value of the reaction mixture is adjusted to 2 to 8, preferably to 2 to 7, but especially to 5 to 6, not later than after completion of the reaction. In order to adjust this pH-value, organic or inorganic acids are for example used, advantageously easily volatile organic acids such as formic acid or acetic acid. As already indicated it is advisable in some cases to add a certain amount of acid to the reaction mixture immediately or shortly after the start of combination of the basic polyamide with the aminoplast precondensate, and also further to add acid during the further reaction, either continuously or in portions. Advantageously, temperatures of 20° to 100° C., especially 20° to 80° C., for example 45° to 70° C., are used. The solutions thus obtained, adjusted with acid to the pH-value mentioned, can be adjusted to a content of for example 10 to 50 percent with water.

They can be employed for various purposes, above all in the textile industry. They are for example suitable for making wool nonfelting, with the wool being impregnated with a liquor to which the preparations and, if desired, yet further additives such as wetting agents, dispersing agents and/or acid have been added, and then being dried and subjected to a treatment at elevated temperature. However, the process for dyeing wool and rendering it nonfelting in which the wool is successively, in optional sequence, on the one hand dyed by the exhaustion method and on the other hand treated at temperatures of 35° to 100° C. and pH-values of 9 to 3 with the preparations of the aminoplast precondensates proves to be particularly advantageous. Dyeing and rendering nonfelting can thereby be combined in a simple manner and carried out in the same apparatus without the wool having to be taken out of the apparatus between the two processes.

Dyeing can in this case be carried out in the usual manner which is in itself known, with any desired dyestuffs which can be used for wool, for example acid wool dyestuffs, 1:1- or 1:2- metal complex dyestuffs or reactive dyestuffs. Equally, the additives which are customary when dyeing wool can be used, such as sulfuric acid, acetic acid, sodium sulfate, ammonium sulfate and levelling agents, possible levelling agents above all being polyglycol compounds of higher aliphatic amines, which can optionally also be quaternized and/or esterified at the hydroxyl groups by means of polybasic acids.

The liquor used for rendering the material nonfelting can, in addition to the preparation of the modified aminoplast precondensate, contain yet further additives, for example salts which can also serve for buffering the liquor to certain pH-values, as is for example the case for alkali salts of phosphoric acid. The amount of the modified aminoplastic precondensate (not counting solvent and water) relative to the weight of the wool is appropriately 0.5 to 5 percent. Advantageously, temperatures of 35° to 100° C. are used and in most cases between 20 and 80 minutes are here needed for a far-reaching to practically complete fixing of the aminoplast precondensate.

The sequence of the two processes is optional but in general it tends to be advantageous first to dye and then to render the material nonfelting. The combined process for dyeing wool and rendering it nonfelting is particularly suitable for package dyeing, where the goods to be dyed are static and the liquor is moved.

In the examples which follow, the parts and percentages are parts by weight and percentages by weight.

EXAMPLE 1

49.4 parts of a condensation product of polymerized linoleic acid and diethylenetriamine with an amine equivalent of 247 are dissolved in 50 parts of isopropanol and warmed to 50° C. An 80 percent strength solution in butanol of 135.5 parts of hexamethylolmelamine dibutyl-ether and tributyl-ether (that is to say a mixture of di-n-butyl and tri-n-butyl ethers of a highly methylolated melamine) in 100 parts of isopropanol, and 12 parts of glacial acetic acid are simultaneously added dropwise over the course of 1½ hours with good stirring. The reaction is complete after a further 95 minutes; a sample gives a clear solution in deionized water.

The mixture is now diluted with water to a solids content of 31.4 percent and stirred until cold. pH-value: 5.5. A film applied to a glass plate is completely insoluble in boiling water after curing for 5 minutes at 130° C.

EXAMPLE 2

62 parts of a condensation product of polymerized linoleic acid and diethylenetriamine with an amine equivalent of 247 are warmed to 50° C. 133 parts of 80 percent strength hexamethylolmelamine dibutyl-ether and tributyl-ether, dissolved in 100 parts of butyl glycol, and 15 parts of glacial acetic acid are simultaneously added dropwise over the course of 60 minutes, with good stirring. The viscosity of the reaction product rises rapidly and after a further 60 minutes a sample gives a clear solution in water. The mixture is now adjusted to a solids content of 40 percent with deionized water and is stirred until cold. pH-value: 5.1.

A film applied to a glass plate is completely insoluble in boiling water after 5 minutes at 130° C.

EXAMPLE 3

62 parts of a condensation product of polymerized linoleic acid and diethylenetriamine with an amine equivalent of 247 are dissolved in 95 parts of methanol and warmed to 50° C. 133 parts of 80 percent strength hexamethylolmelamine dibutyl-ether and tributyl-ether, dissolved in 95 parts of methanol, and 15 parts of glacial acetic acid are simultaneously added dropwise over the course of 1 hour 20 minutes, with good stirring. The mixture is allowed to react further until a sample is water soluble (about 8 hours). It is then diluted to a solids content of 28.6 percent with deionized water and stirred until cold. pH-value: 5.5. A film applied to a glass plate is completely water insoluble after 5 minutes at 130° C.

EXAMPLE 4

74 parts of a condensation product of polymerized linoleic acid and diethylenetriamine, having an amine equivalent of 247, are dissolved in 85 parts of isopropanol and warmed to 50° C. 135.5 parts of 80 percent strength hexamethylolmelamine dibutyl-either and tributyl-ether, dissolved in 100 parts of isopropanol and 18 parts of glacial acetic acid, are simultaneously added dropwise over the course of 1 hour with good stirring. The reaction is complete after a further 1½ hours and a sample gives a clear solution in deionized water. The mixture is now adjusted to a solids content of 29.7 percent with water and stirred until cold. pH-value: 5.7.

A film applied to a glass plate is completely insoluble in boiling water after 5 minutes at 130° C.

EXAMPLE 5

62 parts of a condensation product of polymerized linoleic acid and diethylenetriamine with an amine equivalent of 247, 83 parts of 80 percent strength hexamethylolmelamine dibutyl-ether and tributyl-ether and 145 parts of methanol are stirred for 10 hours at 66 to 68° C. Thereafter 15 parts of glacial acetic acid and 145 parts of deionized water are added and the mixture stirred until cold. A slightly opalescent solution is obtained. Solids content: 30 percent, pH-value: 5.4.

A film applied to a glass plate is completely insoluble in boiling water after 5 minutes at 130° C.

EXAMPLE 6

98.8 parts of a condensation product of polymerized linoleic acid and diethylenetriamine with an amine equivalent of 247 are dissolved in 90 parts of isopropanol and warmed to 50° C. A solution of 67.8 parts of 80 percent strength hexamethylolmelamine dibutyl-ether and tributyl-ether in 90 parts of isopropanol and 24 parts of glacial acetic acid are simultaneously added dropwise over the course of 1½ hours with good stirring. After a further 1½ hours a sample is water soluble. The mixture is now diluted to a solids content of 23 percent with deionized water and stirred until cold. pH-value: 5.8.

A film applied to a glass plate is completely insoluble in boiling water after 5 minutes at 130° C.

EXAMPLE 7

67.8 parts of 80 percent strength hexamethylolmelamine dibutyl-ether and tributyl-ether dissolved in 54 parts of butylglycol, and 36 parts of glacial acetic acid are simultaneously added dropwise over the course of 30 minutes at 21° C. initial internal temperature to 148 parts of a condensation product of polymerized linoleic acid and diethylenetriamine with an amine equivalent of 247, dissolved in 80 parts of butylglycol. In the course of this the temperature rises to 39° C. After completion of the dropwise addition the mixture is stirred for 5 hours at 50° C., thereafter diluted to a solids content of 20 percent with deionized water, and stirred until cold. pH-value: 5.9.

A film applied to a glass plate is highly swellable in boiling water after 5 minutes at 130° C.

EXAMPLE 8

135.5 parts of 80 percent strength hexamethylolmelamine dibutyl-ether and tributyl-ether are dissolved in 80 parts of isopropanol and warmed to 50° C. 39.6 parts of condensation product of polymerized linoleic acid and diethylenetriamine, with an amine equivalent of 247, dissolved in 40 parts of isopropanol, and 9.6 parts of glacial acetic acid are simultaneously added dropwise over the course of 1 hour with good stirring. After a further 7½ hours a sample is water soluble. The mixture is adjusted to a solids content of 30 percent by adding deionized water and is then stirred until cold. pH-value 4.7.

A film applied to a glass plate is completely insoluble in boiling water after 5 minutes at 130° C.

EXAMPLE 9

31.4 parts of a condensation product of polymerized linoleic acid and diethylenetriamine, with an amine equivalent of 247, are dissolved in 30 parts of n-butylglycol and warmed to 80° C. internal temperature. Thereafter a solution of 39 parts of hexamethylolmelamine hexamethyl-ether in 39 parts of butylglycol is added dropwise over the course of 30 minutes. After completion of the dropwise addition the mixture is further stirred for 4 hours at 85° to 89° C. internal temperature and 7.6 parts of glacial acetic acid in 197 parts of deionized water are then added. A clear solution having a solids content of 20 percent and a pH-value of 5.4 is obtained.

EXAMPLE 10

49.4 parts of a condensation product according to example 9, with an amine equivalent of 247, are dissolved in 50 g. of n-butylglycol and warmed to 80° C. internal temperature.

A solution of 49.4 parts of a hexamethylolmelamine etherified with polyethylene glycol and n-butanol, in 50 parts of n-butanol, is then added dropwise over the course of 30 minutes. Four and one-half hours after completion of the dropwise addition 6 parts of glacial acetic acid and 277 parts of deionized water are added and the mixture is stirred until cold. A clear solution having a solids content of 20 percent and a pH-value of 7.0 is obtained.

EXAMPLE 11

47 parts of a condensation product of polymerized linoleic acid and polyamines (mixture of diethylenetriamine and triethylenetetramine having an amine equivalent weight of 181 together with an 80 percent strength solution in n-butanol of 133 parts of hexamethylolmelamine dibutyl-ether and tributyl-ether (that is to say a mixture of di-n-butyl and tri-n-butyl ethers of a highly methylolated melamine) are dissolved in 190 parts of ethanol.

After adding 15 parts of glacial acetic acid the solution is warmed to 50° C. internal temperature over the course of 12 hours. Thereafter, a sample is soluble in water. 380 parts of deionized water are now added and the mixture is stirred further until cold. The solids content of the solution is 20 percent, pH-value 5.5.

EXAMPLE 12

36.3 parts of a condensation product of polymerized linoleic acid and polyalkylenepolyamine with an amine equivalent weight of 146, together with an 80 percent strength solution in n-butanol of 133 parts of hexamethylolmelamine dibutyl-ether and tributyl-ether, are dissolved in 190 parts of ethanol. After adding 15 parts of glacial acetic acid the solution is warmed to 50° C. internal temperature over the course of 12 hours. Thereafter a sample is water soluble. 338 g. of deionized water are now added and the mixture is stirred until cold. A solution having a solids content of 20 percent and a pH-value of 5.5 is obtained.

EXAMPLE 13

31.5 parts of a condensation product according to example 9, having an amine equivalent weight of 247, together with 24.4 parts of trimethylolmelamine dimethyl-ether are dissolved in 73.1 parts of methanol. After adding 7.6 parts of glacial acetic acid the solution is warmed to 50° C. internal temperature over the course of 6 hours. It is then diluted with 142 parts of deionized water and stirred until cold. A solution having a solids content of 20 percent and a pH-value of 5.6 is obtained.

EXAMPLE 14

98.8 parts of a condensation product according to example 9, having an amine equivalent weight of 247, together with 34.8 parts of ethyleneurea-dimethylol-dimethyl-ether are dissolved in 189.2 parts of methanol. After adding 24 parts of glacial acetic acid the mixture is warmed for 6 hours to 50° C. internal temperature. Thereafter 321 parts of deionized water are added and the mixture stirred until cold. A solution having a solids content of 20 percent and a pH-value of 5.8 is obtained.

EXAMPLE 15

98.8 parts of a condensation product according to example 9, having an amine equivalent weight of 247 together with 37.6 parts of propyleneurea-dimethylol-dimethyl-ether are dissolved in 190.4 parts of methanol. After adding 24 parts of glacial acetic acid the mixture is warmed for 6 hours at 50° C. internal temperature. Thereafter 339 parts of deionized water are added and the mixture stirred until cold. A solution having a solids content of 20 percent and a pH-value of 5.8 is obtained.

EXAMPLE 16

98.8 parts of a condensation product according to example 9, with an amine equivalent weight of 247, together with 41.2 g. of glyoxalurea-dimethylol-dimethyl-ether are dissolved in 190 parts of ethanol. After adding 24 parts of glacial acetic acid the mixture is stirred for 6 hours at 50° C. internal temperature. Thereafter 346 parts of deionized water are added and the mixture further stirred until cold. A solution having a solids content of 20 percent and a pH-value of 5.4 is obtained.

EXAMPLE 17

98.8 parts of a condensation product according to example 9, with an amine equivalent weight of 247, together with 46 parts of acetylenediurea-dimethylol-dimethyl-ether are dissolved in 188 parts of methanol. After adding 24 parts of glacial acetic acid the mixture is stirred for 6 hours at 50° C. internal temperature. Thereafter 368 parts of deionized water are added and the mixture further stirred until cold. A solution having a solids content of 20 percent and a pH-value of 5.7 is obtained.

EXAMPLE 18

98.8 parts of a condensation product according to example 1, with an amine equivalent weight of 247, together with 35.4 parts of hydroxyethylcarbamate-dimethylol-dimethyl-ether are dissolved in 186.6 parts of methanol. After adding 24 parts of glacial acetic acid the mixture is stirred for 6 hours at 50° C. internal temperature. Thereafter 325 parts of deionized water are added and the mixture further stirred until cold. A solution having a solids content of 20 percent and a pH-value of 5.7 is obtained.

EXAMPLE 19

49.4 parts of a condensation product according to example 9, with an amine equivalent of 247, together with an 80 percent strength solution of 67.6 parts of hexamethylol-melamine dibutyl-ether and tributyl-ether in n-butanol, are dissolved in 389 parts of n-butanol. After adding 12 parts of glacial acetic acid the solution is warmed for 3 hours to 85° C. internal temperature. A clear solution of low viscosity having a solids content of 20 percent is obtained.

EXAMPLE 20

49.4 parts of a condensation product according to example 9, with an amine equivalent weight of 247 together with 19 parts of N,N'-3,5-dimethyloltetrahydroxadiazin-4-one, are dissolved in 115 parts of methanol. After adding 12 parts of glacial acetic acid the mixture is warmed for 6 hours to 60° C. internal temperature. Thereafter 147 parts of deionized water are added and the mixture is further stirred until cold. A clear solution having a solids content of 20 percent and a pH-value of 6.3 is obtained.

EXAMPLE 21

100 parts of wool yarn are dyed with a reactive dyestuff in a circulation apparatus in the usual manner, and are then neutralized and rinsed. A fresh bath of 4,000 parts of water at 50° C. and 10 parts of the preparation according to example 2 is now allowed to run into the circulation apparatus. After 5 minutes a concentrated aqueous solution of 1.25 parts of trisodium phosphate and 4.75 parts of disodium phosphate is added. After about 20 minutes the aminoplastic precondensate has been absorbed on the wool and the liquor is not warmed to 60° C. and this temperature is maintained for 30 minutes. The wool is then rinsed, centrifuged and dried for one hour at 80° C. The dyed yarn is now nonfelting.

Equal results are obtained if instead of the preparation of example 1, one of the preparations according to examples 3, 5, 6 or 7 is used.

EXAMPLE 22

100 parts of wool yarn are first dyed with a reactive dyestuff in the usual manner in a hank-dyeing apparatus. After a thorough rinsing process, the yarn is treated as follows:

The treatment bath of 3,000 parts of water is warmed to 40° C. Three parts of 25 percent strength ammonia and 8 parts of the preparation according to example 9 are then added. A fine emulsion forms in the treatment bath and is uniformly absorbed on the wool yarn in about 20 minutes. Four parts of trisodium phosphate, dissolved beforehand in 20 parts of water, are then added. After a further 30 minutes 0.2 percent of a condensation product of 1 mol of octadecyl alcohol and 35 mols of ethylene oxide is added.

After a further 5 minutes the material is rinsed. After drying, the yarn is nonfelting according to IWS Specification 7B. Similar results are achieved with preparations according to examples 10, 12 to 20.

We claim:

1. A stable preparation of a water-soluble modified aminoplast precondensate which is obtained by reacting at a temperature of 20° to 100° C.
   a. at least one alkyl-ether of a methylolaminotriazine with
   b. at least one basic polyamide from dimerized to trimerized linoleic or linolenic acid and a polyamine of the formula $$H_2N-(CH_2-CH_2-NH)_n-CH_2-CH_2-NH_2$$

in which $n$ is a whole number of at most 3 in the presence of an organic solvent soluble in water or miscible with water and an easily volatile organic acid added not later than after completion of the reaction to ensure that a sample of the reaction mixture has a pH value of 2 to 8 after addition of water.

2. A stable preparation according to claim 1, characterized in that an alkyl-ether of highly methylolated melamine, of which the alkyl radicals contain 1 to 4 carbon atoms are used as component (a).

3. A stable preparation according to claim 1, characterized in that an n-butyl-ether of highly methylolated melamine which contains 2 to 3 n-butyl radicals in the molecule are used as component (a).

4. A stable preparation according to claim 1, characterized in that an organic solvent which is infinitely miscible with water is used.

5. A stable preparation according to claim 1, characterized in that the pH-value of the reaction mixture is adjusted with aliphatic carboxylic acids having 1 to 3 carbon atoms.

6. A stable preparation according to claim 1, characterized in that the reaction mixture is adjusted to a pH-value of 2 to 7.

7. A stable preparation according to claim 1, characterized in that the modified aminoplast precondensate is obtained by reacting (a) hexamethylol melamine dibutyl- and tributyl-ether with (b) a condensation product of di- to trimerized linoleic acid and diethylene-triamine.

8. A stable preparation according to claim 1, characterized in that the modified aminoplast precondensate is obtained by reacting (a) hexamethylol melamine etherified with polyethylene glycol and n-butanol with (b) a condensation product of di- to trimerized linoleic acid and diethylenetriamine.

9. A process for the manufacture of a stable preparation of a water-soluble modified aminoplast precondensate which comprises reacting at a temperature of 20° to 100° C.
   a. at least one alkyl-ether of a methylolaminotriazine with
   b. at least one basic polyamide from dimerized to trimerized linoleic or linolenic acid and a polyamine of the formula $$H_2N-(CH_2-CH_2-NH)_n-CH_2-CH_2-NH_2$$

in which $n$ is a whole number of at most 3 in the presence of an organic solvent soluble in water or miscible with water and an easily volatile organic acid added not later than after completion of the reaction to ensure that a sample of the reaction mixture has a pH value of 2 to 8 after addition of water.